(12) United States Patent
Lee (10) Patent No.: US 6,816,448 B2
(45) Date of Patent: Nov. 9, 2004

(54) DOOR ASSEMBLY FOR AN OPTICAL DRIVE

(75) Inventor: Peter K. Lee, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 529 days.

(21) Appl. No.: 09/875,206

(22) Filed: Jun. 7, 2001

(65) Prior Publication Data

US 2002/0186639 A1 Dec. 12, 2002

(51) Int. Cl.⁷ .............................................. G11B 33/02
(52) U.S. Cl. ...................................................... 369/75.1
(58) Field of Search .............................. 369/75.1–75.2, 369/77.1–77.2, 191, 278

(56) References Cited

U.S. PATENT DOCUMENTS

| | | | | |
|---|---|---|---|---|
| 4,561,084 A | * | 12/1985 | Satake et al. ............... | 369/75.2 |
| 4,759,008 A | * | 7/1988 | Hirano et al. ............... | 369/75.2 |
| 6,243,347 B1 | * | 6/2001 | Kawana et al. ............ | 369/77.1 |

\* cited by examiner

*Primary Examiner*—Allen Cao (57) ABSTRACT

The present invention is directed to a door assembly and separate actuating assembly for covering a standard optical drive, such as a CD-ROM, a DVD, a DVD-ROM, a CDRW and a DVDRW. The CD door is molded of a plastic of a color matching the rest of a computer case. The actuator bar is made of a clear plastic capable of carrying light. The door is pivotably mounted to the case and has a separate spring return. The actuating bar is separately mounted to the computer case at a pivotal mounting portion and has an integral plastic spring to return the actuating bar to its normal position. A guide feature is provided at an opposite end of the actuating bar from the pivotal mounting portion to guide the actuating bar and to provide support.

19 Claims, 6 Drawing Sheets

DOOR ASSEMBLY FOR AN OPTICAL DRIVE

RELATED APPLICATION

This present application is related to co-pending application Ser. No. 09/875,128 entitled "A LIGHT PIPE ASSEMBLY FOR AN OPTICAL DRIVE", filed on even date herewith and assigned to the instant assignee and which is hereby incorporated by reference into this specification in its entirety.

FIELD OF THE INVENTION

The present invention relates generally to computers and, more particularly, to a door assembly and actuator assembly for covering and actuating an optical drive.

BACKGROUND OF THE INVENTION

Until recently, almost all home personal computers had beige cases. The same was true for computer monitors. However, more recently, personal computers including the computer cases and computer monitors have become fashion accessories for the home and office.

Figure 1A:
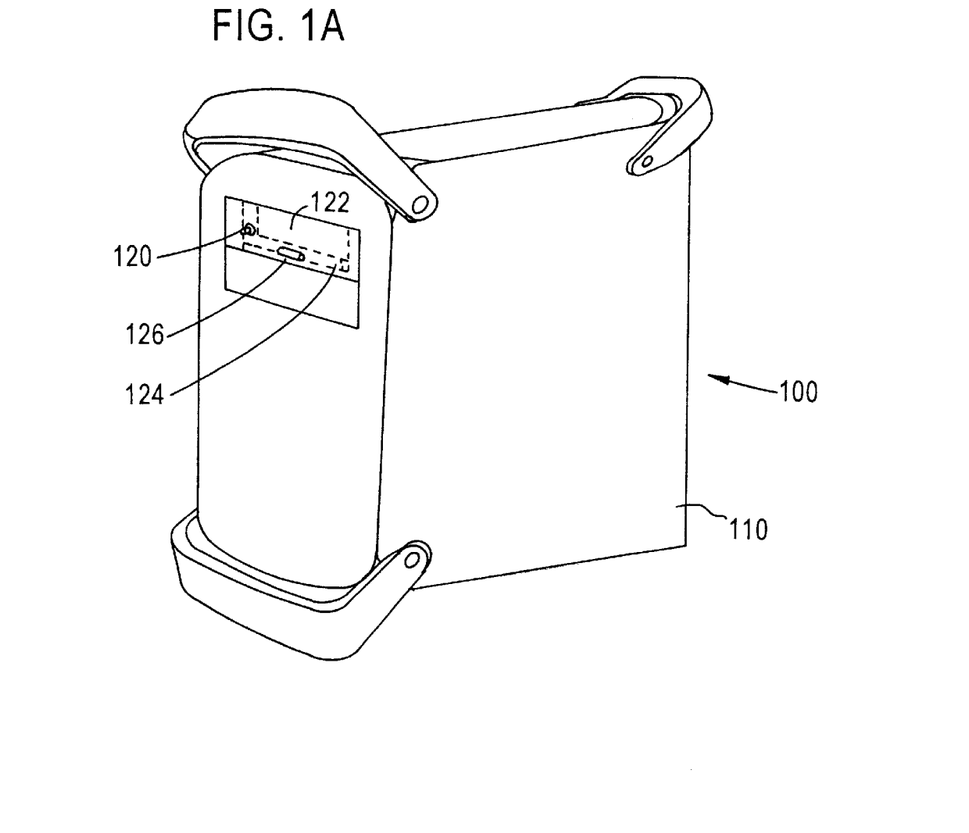
FIG. 1A is a perspective view of a typical computer case including a CD door assembly.

For example, a computer 100 is depicted in FIG. 1A, having a computer case 110 is made from a colorful plastic, such as blue, green or violet. However, the exterior surfaces of components such as an optical compact disc read-only memory CD-ROM drive are still manufactured from a beige plastic material. These components are manufactured in high quantities and are typically available in the standard beige exterior.

In order to still be able to use the standard optical CD-ROMs and harmonize the entire appearance of the computer 100, it is necessary to cover the CD-ROM drive yet still allow the CD drive to be able to open. Other optical drives such as a DVD, a DVD-ROM, a CDRW and a DVDRW also have trays which open and need to be covered to harmonize the appearance of the computer case.

Figure 1B:
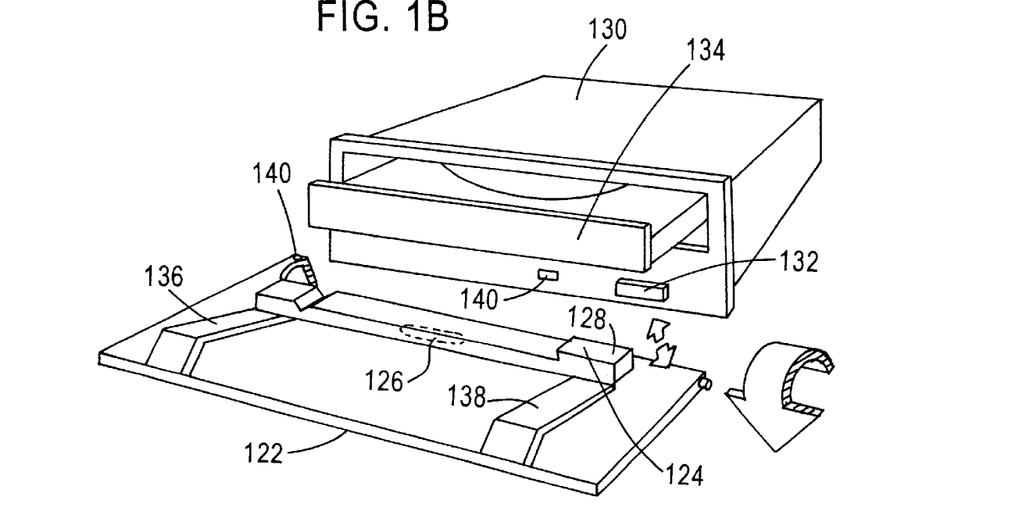
FIG. 1B is an exploded perspective view of a standard CD-ROM and a CD door assembly in an open position with the computer case omitted for clarity.

Referring again to FIG. 1A, a CD door assembly 120 is depicted covering a standard CD-ROM 130 (see FIG. 1B). The CD door assembly 120 includes a CD door 122, and an actuating bar assembly 124 pivotably mounted to the CD door 122. The actuating bar assembly 124 includes an exterior activating button 126 to be pressed by a user and an interior actuating portion 128 for making contact with a CD button 132 which is part of the standard CD-ROM 130. As depicted in FIG. 1A, CD door assembly 120 is in a closed position. When a user wants to open the standard CD-ROM 130, the user presses on the actuating button 126 causing the actuating bar 124 to pivot in a counter-clockwise direction as depicted in FIG. 1B. The pivoting action of the actuating bar 124 causes the actuating portion 128 to come into contact with the CD button 132. Once the CD button 132 is actuated, the CD tray 134 will move against the bias of a spring load return 140 causing the CD door assembly 120 to pivot from the vertical closed position depicted in FIG. 1 into a horizontal open position as depicted in FIG. 1B. Ramps 136, 138 are provided on the interior of the CD door 122 to facilitate the door 122 moving to the open horizontal position depicted in FIG. 1B. The spring load return 140 is attached to the actuating bar 124 and urges both the actuating bar 124 and the door 122 towards the closed normal position depicted in FIG. 1A.

There are several possible drawbacks to the described CD door assembly 120. The first disadvantage is that the actuating bar assembly 124 rotates with the door 122 such that when the CD tray 134 is in the open position, it is necessary to push CD tray 134 in a direction towards the standard CD-ROM 130 in order to close the CD tray 134. It is much more desirable to use the CD button 132 to cause the CD tray 134 to retract. Also, because the actuating bar assembly 124 has rotated approximately 90°, the actuating bar 124 is not in a position to carrying light emitted by the LED 124. Another difficulty with the CD door assembly 120 is that the actuating bar 124 is not fully supported along its length and is only cantilevered from and supported by a single pivot point. Because there is only a single pivot point, the actuating bar assembly may sag over time, and there may be excessive stress on the single pivot point causing breakage of the actuating bar assembly at the pivot point.

SUMMARY OF THE INVENTION

It is, therefore, an object of the present invention to provide a door for covering an optical drive which pivots independently of an actuating bar assembly so that the actuating bar is used to actuate the CD-ROM drive when the CD tray is in the open position.

It is another object of the present invention to provide an actuating bar which can be used to actuate the optical drive to retract the CD tray when the CD tray is in an open position.

It is yet another object of the present invention to provide an actuating bar having a spring bias independent of a spring bias for the door assembly.

It is yet another object of the present invention to provide an actuating bar having a guiding feature which guides and supports the actuating bar throughout pivotal movement.

Yet another object of the present invention is to provide an actuating bar assembly that can carry light emitted by the optical drive when the optical drive is in the open position.

The present invention is directed to a door assembly and separate actuating assembly for covering a standard optical drive, such as a CD-ROM. The CD door is molded of a plastic of a color matching the rest of a computer case. The actuator bar is made of a clear plastic capable of carrying light. The door is pivotably mounted to the case and has a separate spring return. The actuating bar is separately mounted to the computer case at a pivotal mounting portion and has an integral plastic spring to return the actuating bar to its normal position. A guide feature is provided at an opposite end of the actuating bar from the pivotal mounting portion to guide the actuating bar and to provide support.

These and other objects of the present invention are achieved by a door assembly for an optical drive. The optical drive has at least one LED and an actuating button. A tray holder is movable between an operating position to an open position. The door assembly is mountable to a computer case. A door is pivotably mounted to the computer case and is pivotable between an open position and a closed position. A biasing mechanism is associated with the door for pivoting the door into the closed position from the open position when the tray holder moves from the open position to the operating position. A clear actuator is pivotably mounted to the computer case and is pivotable from a normal position to an actuating position in contact with the actuating button. The actuator has an integral spring biasing the actuator towards the normal position. When the actuator is brought into the actuating position and the at least one LED emits light, the actuator carries the light outwardly to be visible outside the computer case.

The foregoing and other objects of the present invention are achieved by an actuator assembly for an optical drive mounted in a computer case. The optical drive has at least one LED, an actuator button and a tray holder movable between an operating position and an open position. The actuator assembly includes a clear body portion extending horizontally and pivotably mounted to the computer case along a vertical axis. A spring portion biases the body portion in a direction away from the optical drive.

The foregoing and other objects of the present invention are achieved by a method of actuating an optical drive in a computer case. The optical drive has at least one LED, an actuator button and a tray holder movable between an operating position and an open position. The computer case has a door assembly mounted to the computer case and an actuator assembly mounted to the computer case. The method includes pivoting the actuator assembly from a normal position to an actuating position in contact with the actuating button along a first axis against a bias of a biasing mechanism. Following the pivoting step, the door assembly pivots along a second axis while the actuator remains in the first axis.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE DRAWINGS

Figure 2A:
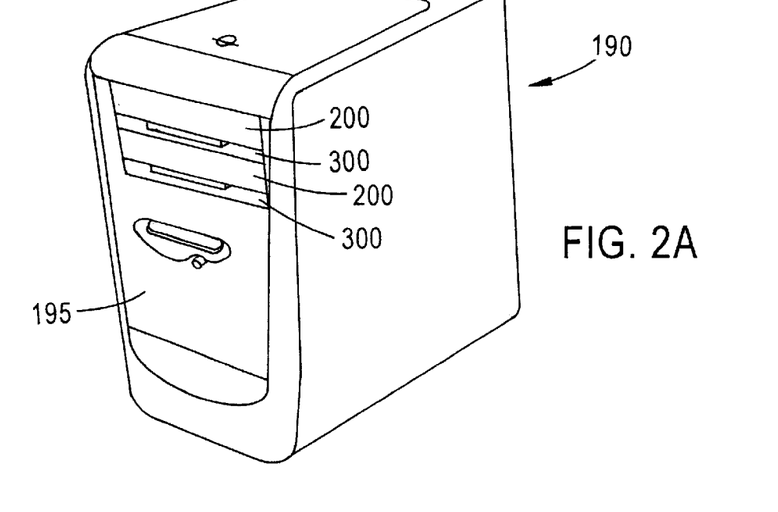
FIG. 2A is a perspective view of a computer case including a door assembly and an actuating bar assembly according to the present invention.
Figure 2B:
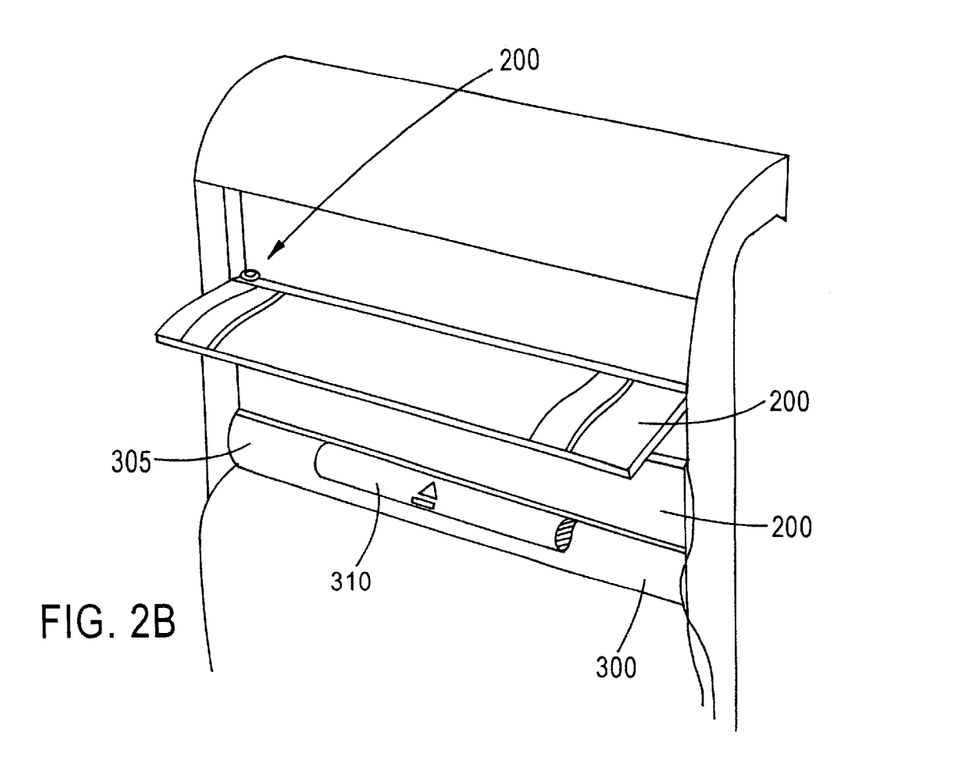
FIG. 2B is a perspective view of the door assembly shown in the open position with the CD-ROM omitted for clarity.

Referring now to FIGS. 2A and 2B, a computer case, generally indicated at 190, is depicted. The computer case includes a color portion 195 which can be molded in any desirable color. As depicted in FIG. 2A, there are two door assemblies 200 and two actuating bar assemblies 300, although any number of assemblies 200, 300 can be included depending on the number of optical drives included with the particular computer. The door assemblies 200 and the actuating assemblies 300 in FIG. 2A cover the standard optical drives. The invention is not only usable for an optical drive but any type of drive in which there is a tray or a portion of the drive which is moved to an open position.

As depicted in FIG. 2B, the door 200 is shown in an open position with the CD-ROM 130 omitted for clarity. As depicted in FIG. 2B, the actuating bar assembly 300 includes an actuating bar 305 having a clear LED window 310 which carries light emitted by the LED 140. The clear LED window 310 is preferably made from polycarbonate because this material has excellent hinge capability and can be flexed many times before failure. Alternatively, an acrylic can be used. The clear LED window 310 must be large enough to accommodate any possible position of the LED 140. The door assembly 200 and the actuating bar assembly 300 form a portion of the computer case. Advantageously, depending on the location of the LED 140, which varies among CD-ROM manufacturers, the clear LED window 310 will carry the light emitted by the LED when the optical drive 130 is in use.

Figure 3:
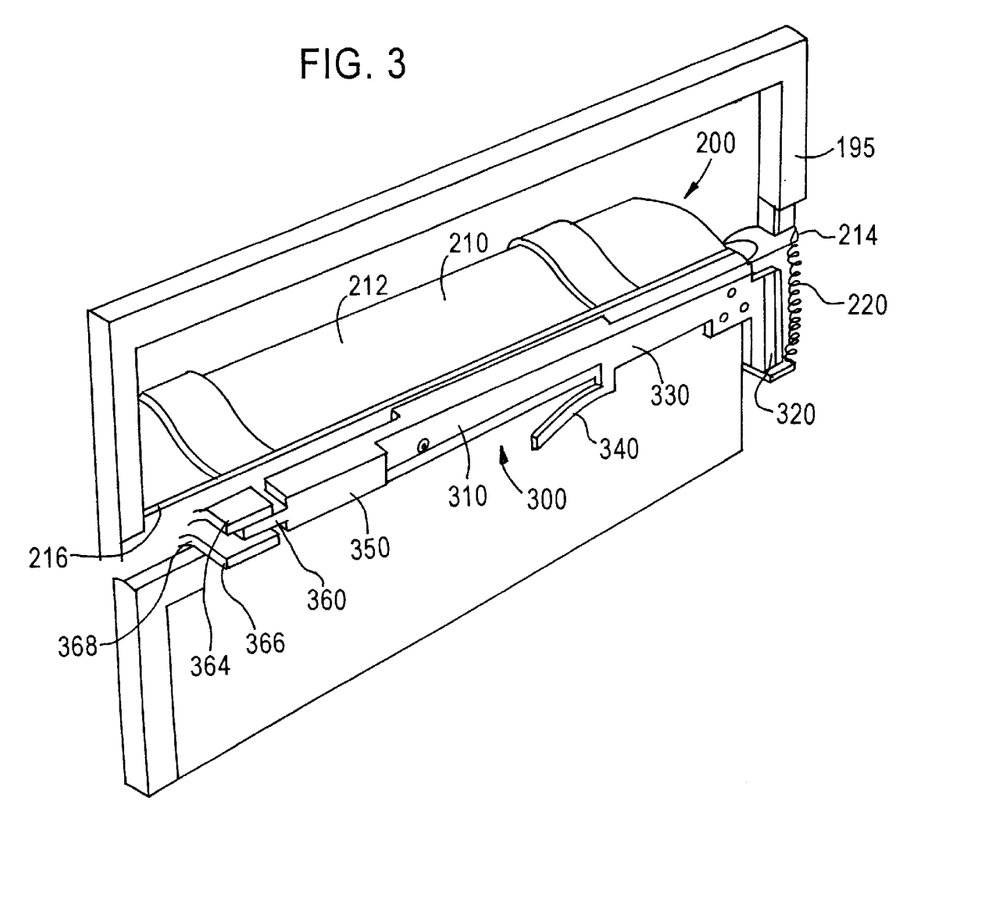
FIG. 3 is a rear perspective view showing the door in an open position and the actuating assembly in the normal position.

Refer now to FIG. 3, where a rear perspective view of the door assembly 200 and the actuating assembly 300 is illustrated. The door assembly 200 includes a door 210 pivotably mounted to the computer case 195. Most preferably, the door 210 would be molded from the same batch of plastic material as the color portion 195 so that the color portion 195 and door 210 match colors closely or exactly. The door 210 includes a main door portion 212 and a pair of cylindrical pivot sections 214, 216 extending from opposite edges of the door 212 and at a lower edge thereof to allow the door 212 to rotate outwardly into an open position as depicted in FIG. 3 when the CD tray 134 moves to an open position as depicted in FIG. 1B. It should be noted that the CD-ROM or optical drive 130 has been omitted from FIG. 3 for clarity. The door assembly 200 includes a spring return 220. The spring return 220 is a compression spring and is attached to pivot 214, and as depicted in FIG. 3, to the actuator assembly 300. The opposite end of the spring return 220 can also be suitably attached to the computer case 195.

The actuator assembly 300 includes the actuating bar 305 located below the door 210. As depicted in FIG. 3, the actuating bar 305 has a clear LED window 310 a pivot portion 320, an integral spring 340, an actuating portion 350 and a guiding feature 360. The pivoting portion 320 is cylindrically shaped and is located at one end of the actuating assembly 300. The spring portion 340 extends downwardly and parallel to the central portion 330 and is in contact with a central surface of the CD-ROM 130 located below the CD tray 134 (see FIG. 1B). The actuating portion 350 can be brought into engagement with the CD button 132. The guiding feature 362 includes a horizontally extending portion 360 which extends from the actuating portion 350. An upper guide 364 and a lower guide 366 connected to the color portion 195 maintain guide portion 360 in a horizontal position. The guide portions 364, 366 can be molded as part of the computer case 195.

In operation, a user presses the actuating bar 305 in the center of the clear LED window 310 (see FIG. 2B) causing the actuating bar 305 to pivot in a counter-clockwise rotation as depicted in FIG. 3 against the bias of spring 340. This will cause the CD button 132 to be depressed thereby actuating the standard CD-ROM 130 to move the CD tray 134 into its open position. As the CD tray 134 moves to the open position, the CD tray 134 will cause the door 212 to pivot to the open position shown in FIG. 3. After the user actuates the actuating bar 305, the spring 340 will return the actuating bar 310 to a normal position in which a forward edge of a guide 360 is in contact with a portion 368 that connects the upper and lower guide 362, 364.

Figure 4:
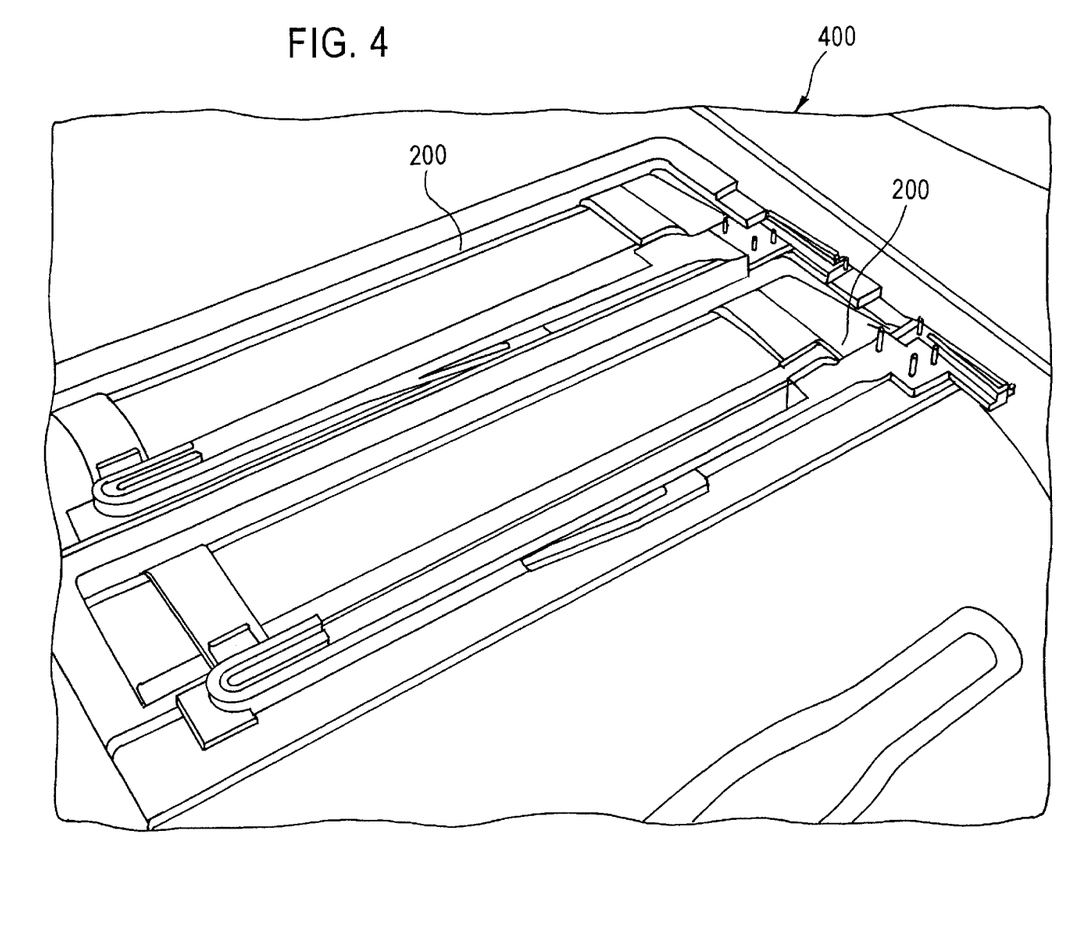
FIG. 4 is a rear perspective view of multiple door assemblies according to the present invention.
Figure 5:
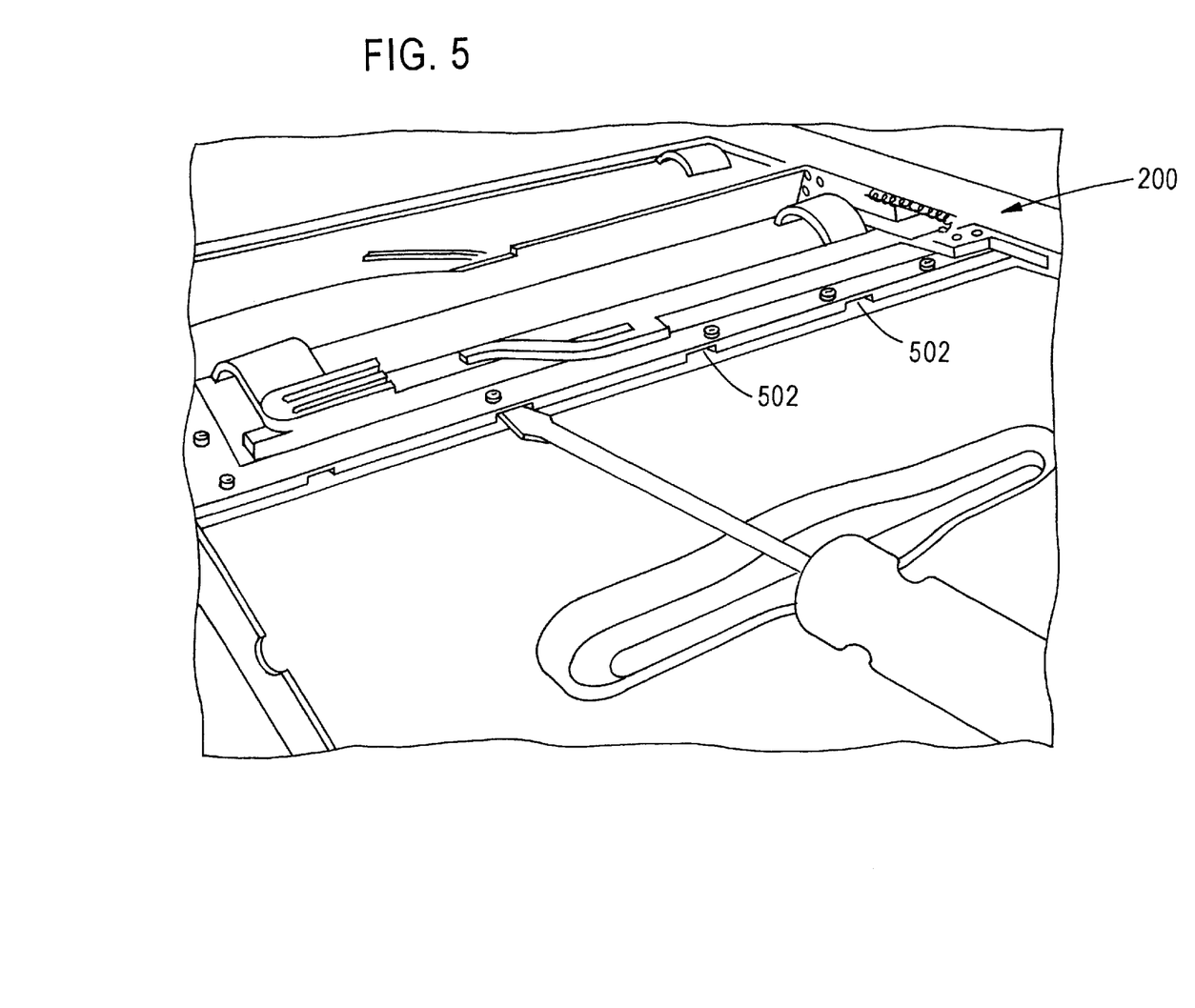
FIG. 5 is a perspective view illustrating removal of a lower door assembly.
Figure 6:
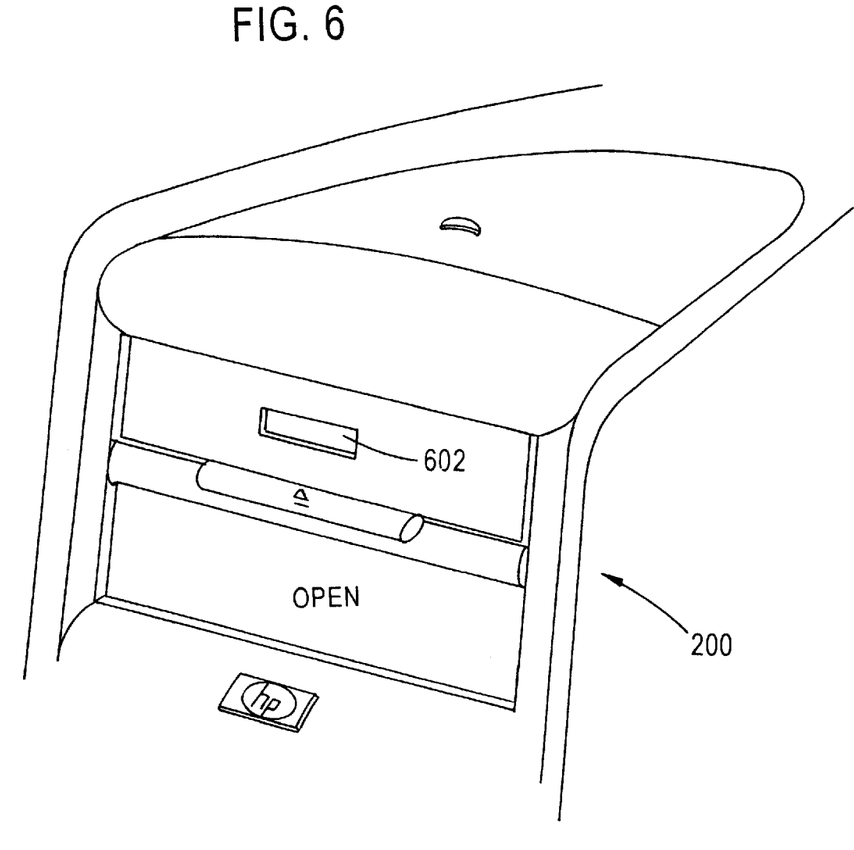
FIG. 6 is a front elevational view showing a recess area for a label.

FIG. 4 illustrates two door assemblies 200 formed which together form a two door assembly 400. In FIG. 5, the lower door assembly 200 in FIG. 4 is removable by the customer as illustrated in FIG. 5. A plurality of slots 502 are molded into the door assembly 200 into which a screw driver blade is inserted to pry the door assembly 200 loose from the computer case. For example, if the customer decides to put an optical drive behind the door assembly 200, then it is not necessary to remove the door assembly 200. However, if the customer chooses to put a device other than an optical drive (3.5" zip drive, pcmcia reader, etc.) then the door assembly 200 needs to be removed. The door assembly 200 is held on the computer case using heat stick fastener and thus using the screw driver can be readily removed. FIG. 6 illustrates a recess area 602 for a label to identify the type of drive behind the door assembly 200.

It should now be apparent that a door assembly and an actuating assembly have been described in which the door assembly pivots independently from the actuating assembly, thereby allowing the actuating assembly to be used to return the CD tray to an operating position from the open position. Further, it should be apparent that an actuating assembly which is guided at both ends thereof will provide a secure and stable actuator for the user. Also advantageously, a door and actuating assembly which covers a standard optical drive and also blends into an aesthetically pleasing computer case has also been described.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A door assembly for an optical drive, the optical drive having at least one LED and an actuating button and a tray holder movable between an operating position to an open position, the door assembly mountable to a computer case, comprising:
    a door pivotably mounted to the computer case and pivotable between an open position and a closed position;
    a biasing mechanism associated with said door for pivoting said door into said closed position from said open position when the tray holder moves from the open position to the operating position;
    a clear actuator pivotably mounted to the computer case and pivotable from a normal position to an actuating position in contact with the actuating button and having an integral spring biasing said actuator towards said normal position,
    wherein when said actuator is brought into said actuating position and the at least one LED emits light, said actuator carries the light outwardly to be visible outside the computer case.

2. The door assembly of claim 1, wherein the at least one LED is located in one of several horizontal positions on the optical drive.

3. The door assembly of claim 1, wherein said integral spring is in contact with the optical drive.

4. The door assembly of claim 1, wherein the computer case includes a guide portion located at one end of said actuator for providing a stop for said actuator in said normal position and for maintaining said actuator in a horizontal orientation.

5. The door assembly of claim 1, wherein said door pivots along a first axis and said actuator pivots along a second axis.

6. The door assembly of claim 1, wherein said door pivots along a horizontal axis and said actuator pivots along a vertical axis.

7. The door assembly of claim 1, wherein said clear actuator is made from one of an acrylic and a polycarbonate.

8. The door assembly of claim 1, wherein said actuator has a light carrying portion and a spring portion having a compressed portion in contact with the optical drive.

9. The method of claim 1, wherein the biasing mechanism is an extension spring.

10. An actuator assembly for an optical drive mounted in a computer case, the optical drive having at least one LED, an actuator button and a tray holder movable between an operating position and an open position, comprising:
    a clear body portion extending horizontally and pivotably mounted to the computer case along a vertical axis, said clear body portion pivotable from a normal position to an actuating position in contact with the actuating button; and
    a spring portion for biasing said body portion in a direction away from the optical drive; wherein when said clear body portion is brought into said actuating position and the at least LED emits light, said clear body portion carries the light outwardly to be visible outside the computer case.

11. The actuator assembly of claim 10, wherein said clear body portion and said spring portion are joined by a vertical extending connecting portion.

12. The actuator assembly of claim 10, wherein said clear body portion and said spring portion are integrally molded as a one-piece assembly.

13. The actuator assembly of claim 10, wherein said clear body portion is one of acrylic and a polycarbonate.

14. The actuator assembly of claim 11, wherein said actuator has a normal position and an actuating position in contact with the actuating button, the computer case having a guide portion located at one end of said actuator for providing a stop for said actuator in said normal position and for maintaining said actuator body portion in a horizontal orientation.

15. A method of actuating an optical drive in a computer case, the optical drive having at least one LED, an actuator button and a tray holder movable between an operating position and an open position, the computer case having a door assembly mounted to the computer case and an actuator assembly mounted to the computer case, comprising:
    pivoting the actuator assembly from a normal position to an actuating position in contact with the actuating button along a first axis against a bias of a biasing mechanism wherein said actuator assembly includes a clear actuator pivotable from the normal position to the actuating position;
    pivoting the door assembly along a second axis following said pivoting step while the actuator remains in the first axis, and carrying light in said clear actuator when said clear actuator is brought into said actuating position and the at least one LED emits light, said actuator carrying the light outwardly to be visible outside the computer case.

16. The method of claim 15, comprising carrying light in actuator assembly emitted by the at least one LED.

17. The method of claim 15, wherein the first axis is a vertical axis and the second axis is a horizontal axis.

18. The method of claim 15, comprising biasing the door assembly into a closed position when the tray holder is in the operating position.

19. The method of claim 15, biasing the biasing mechanism against the optical drive by placing the biasing mechanism in contact with the optical drive.

* * * * *